S. YANKAUER.
ROTARY VALVE.
APPLICATION FILED AUG. 20, 1908.
930,017.
Patented Aug. 3, 1909.
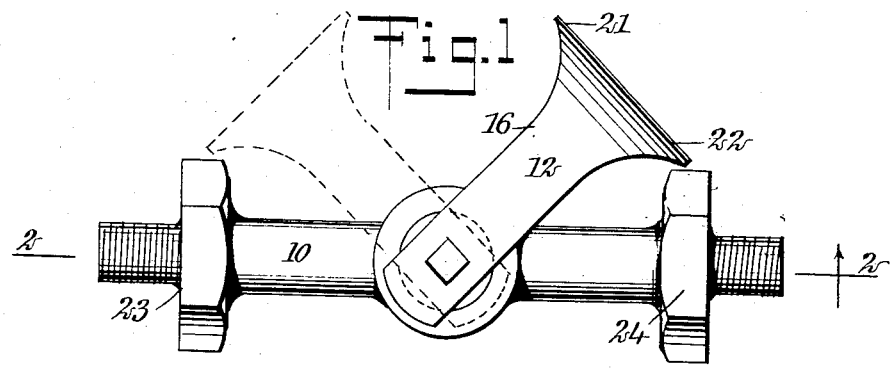
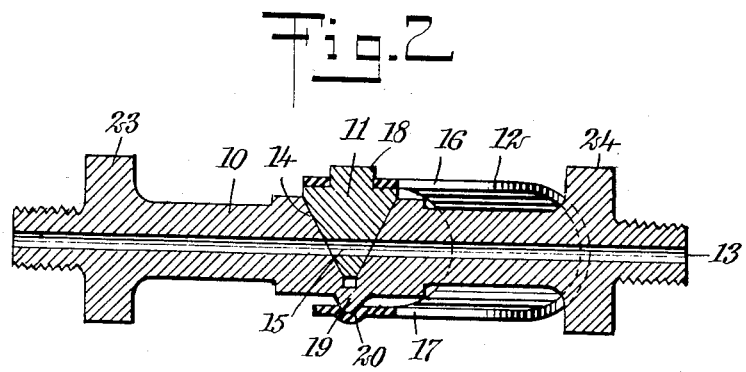
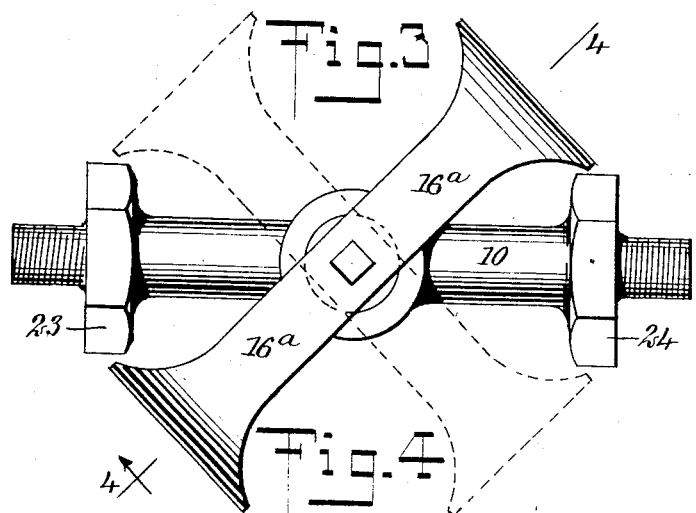
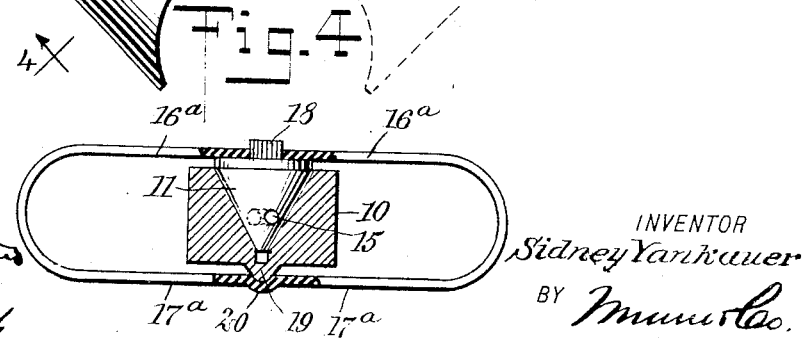
WITNESSES
John A. Bergstrom
C. W. Fairbank
INVENTOR
Sidney Yankauer
BY Munn & Co.
ATTORNEYS

UNITED STATES PATENT OFFICE.

SIDNEY YANKAUER, OF NEW YORK, N. Y.

ROTARY VALVE.

No. 930,017.

Specification of Letters Patent.

Patented Aug. 3, 1909.

Application filed August 20, 1908. Serial No. 449,449.

*To all whom it may concern:*

Be it known that I, SIDNEY YANKAUER, a citizen of the United States, and a resident of the city of New York, borough of Manhattan, in the county and State of New York, have invented a new and Improved Rotary Valve, of which the following is a full, clear, and exact description.

This invention relates to certain improvements in rotary valves, and more particularly to the means for holding the turning plug within the valve casing.

The object of the invention is to provide a valve in which the valve plug is resiliently held in place, so that leakage is effectively prevented, and in which the rotation of the valve in opening and closing the same tends to continuously grind the valve plug and seat and maintain a perfect fit.

A further object is to avoid the use of any nuts, screws, washers, or the like, for holding the plug to its seat, and utilize the handle as the sole means for resiliently holding the plug in position.

Reference is to be had to the accompanying drawings, forming a part of this specification, in which similar characters of reference indicate corresponding parts in all the figures, and in which—

Figure 1 is a side elevation of a valve constructed in accordance with my invention; Fig. 2 is a longitudinal section on the line 2—2 of Fig. 1; Fig. 3 is a side elevation similar to Fig. 1, but showing a modified form of spring handle; and Fig. 4 is a transverse section on the line 4—4 of Fig. 3.

In the preferred form of my valve, the entire construction includes but three parts: a valve casing 10, a turning plug 11, and a spring handle 12. The valve casing is provided with a passage 13 therethrough and extending into one side of the casing, and intersecting the passage is a conical recess 14 constituting the valve seat. The recess extends inwardly at substantially right angles to the passage 13 for the fluid. The conical recess or valve seat 14 does not extend entirely through the valve casing but crosses the fluid passage 13.

Within the valve seat, I mount my improved valve plug 11, which is conical in form and provided with a passage 15 extending transversely therethrough. With the valve plug in one position, the passages 15 and 13 are in alinement for the free flow of the fluid, while when the valve plug is rotated through approximately ninety degrees, the passage of the fluid is positively prevented. For rotating the valve, I provide the handle 12, which serves also as the sole means for retaining the valve plug within the casing. This handle is in the form of a loop, having oppositely-disposed side members 16 and 17, one of which is adapted to engage with the outer end of the valve plug and the other of which is adapted to engage with the valve casing in alinement with the axis of rotation of said plug. The outer end of the plug and the side member 16 of the handle are so constructed that the plug may be rotated by the handle. As shown, the plug is provided with a square stud 18 extending into a square recess in the side member 16 of the spring handle. For rotating the opposite side member 17 of the spring handle in engagement with the casing, any form of bearing may be provided which will also constitute a centering device. As shown, the valve casing is provided with a stud 19, in alinement with the axis of the turning plug, and the side member 17 of the spring handle is provided with a recess or depression 20, adapted to receive this stud or projection. The handle is of resilient material and so formed that the two side members 16 and 17 continuously tend to press toward each other, whereby the valve is firmly held against its seat at all times independently of the extent to which it may be worn, as the more the valve wears, the farther it will be forced inwardly by the action of the spring handle. The valve is not only kept firmly to its seat and perfectly ground by the opening and closing movement, but the leakage is further reduced to the minimum as it can escape from the casing toward only one end of the plug. The smaller end of the plug does not extend through the casing, and it is therefore impossible for any fluid to escape at this end. There are no nuts, bolts, screws, or washers to become loosened or displaced, and no tools are necessary in assembling or disassembling the valve. It is only necessary to spring the side member 16 out of engagement with the stud 18 of the valve casing and remove the spring handle, whereupon the valve plug may be readily lifted from its seat.

Any suitable means may be employed for limiting the extent of rotation of the valve plug, but I preferably provide the spring handle 12 with extensions 21 and 22, extending in opposite directions from the outermost portion thereof, which extensions may engage with collars or flanges 23 and 24, respectively, on the valve casing.

With the parts in the position indicated in Figs. 1 and 2, the valve will be opened to the maximum extent and further rotation of the valve plug will be prevented by the engagement of the projection 22 with the flange 24. By rotating the valve plug through ninety degrees, the valve will be closed and the projection 21 will come in contact with the flange 25, as indicated in dotted lines in Fig. 1. The member 12 thus serves not only as a handle, but also as the sole means for holding the valve to its seat and as a stop for limiting the extent of rotation of the valve.

In Figs. 1 and 2, I have illustrated the spring handle in the form of a U-shaped loop having the side members 16 and 17 terminating adjacent the casing and turning plug. If desired, the handle may be constructed in the form of a closed loop, as indicated in Figs. 3 and 4, instead of an open loop. The handle when in the form of a closed loop, may be made of thinner material, as the two halves each exert a spring action, and the total spring action is more than double that produced by a single half when used alone. In the closed loop handle, the two side members 16$^a$, 16$^a$, of the two halves are in direct alinement with each other, as are also the two side members 17$^a$, 17$^a$ opposed thereto. Save as regards the spring handle, the valve illustrated in Figs. 3 and 4, is substantially identical with that illustrated in Figs. 1 and 2. By employing the double loop and having it extend in opposite directions from the axis of the turning plug, the valve may be opened or closed by attaching separate cords or chains to the opposite ends, whereby upon pulling on one cord or chain, the valve may be opened, and by pulling on the other, it may be closed.

Having thus described my invention, I claim as new and desire to secure by Letters Patent:

1. The combination of a valve casing having a conical chamber passing partly but not wholly through said casing and constituting a valve seat, a conical valve plug within said chamber but out of engagement with the bottom thereof, and a handle having engagement with the outer end of said plug and also having engagement with the casing opposite to said chamber and in alinement with the axis of the plug, said handle also serving as a means for resiliently holding said valve to its conical seat.

2. A valve including a member having a valve seat and inlet and outlet passages terminating therein, a rotatable controlling member in engagement with said seat and having a passage for connecting said inlet and outlet passages, and a U-shaped spring having one end thereof in engagement with said rotatable controlling member and having the opposite end thereof in engagement with the casing upon the surface thereof opposite to said seat and in alinement with the axis of rotation of said controlling member, said spring serving to hold said controlling member in resilient engagement with said seat and also serving as a handle to facilitate the rotation of said controlling member.

In testimony whereof I have signed my name to this specification in the presence of two subscribing witnesses.

SIDNEY YANKAUER.

Witnesses:
CLAIR W. FAIRBANK,
JOHN P. DAVIS.